(12) United States Patent
Rodriguiez

(10) Patent No.: US 11,719,580 B1
(45) Date of Patent: Aug. 8, 2023

(54) INTEGRATED ACCESS GATEWAY

(71) Applicant: Fireside Security Group, Inc., San Mateo, CA (US)

(72) Inventor: Guido Rodriguiez, San Mateo, CA (US)

(73) Assignee: Fireside Security Group, Inc., Redwood City, CA (US)

( * ) Notice: Subject to any disclaimer, the term of this patent is extended or adjusted under 35 U.S.C. 154(b) by 293 days.

(21) Appl. No.: 17/302,919

(22) Filed: May 14, 2021

Related U.S. Application Data

(60) Provisional application No. 62/704,511, filed on May 14, 2020.

(51) Int. Cl.
| | | |
|---|---|---|
| *G01J 5/00* | (2022.01) | |
| *G01J 5/07* | (2022.01) | |
| *G01J 5/02* | (2022.01) | |
| *G01J 5/53* | (2022.01) | |
| *H04L 65/1104* | (2022.01) | |

(52) U.S. Cl.
CPC ............. *G01J 5/07* (2022.01); *G01J 5/025* (2013.01); *G01J 5/53* (2022.01); *H04L 65/1104* (2022.05); *G01J 2005/0077* (2013.01)

(58) Field of Classification Search
CPC ...... G01J 5/07; G01J 5/53; G01J 5/025; G01J 2005/0077; H04L 65/1104
USPC ........ 374/121; 250/338.1; 702/135; 600/549
See application file for complete search history.

(56) References Cited

U.S. PATENT DOCUMENTS

| | | | | |
|---|---|---|---|---|
| 5,212,655 A | * | 5/1993 | Boehle | G01S 17/89 702/155 |
| 10,542,140 B1 | * | 1/2020 | Tang | H04W 12/50 |
| 2004/0000999 A1 | * | 1/2004 | Turner | G01V 3/10 340/572.4 |
| 2004/0178789 A1 | * | 9/2004 | Candelore | G01V 3/08 324/67 |
| 2006/0116555 A1 | * | 6/2006 | Pavlidis | A61B 5/6888 600/300 |
| 2007/0153871 A1 | * | 7/2007 | Fraden | A61B 5/015 374/121 |
| 2012/0026328 A1 | * | 2/2012 | Sethna | G06V 10/42 348/143 |
| 2016/0259980 A1 | * | 9/2016 | Mlybari | G06T 7/277 |
| 2021/0393139 A1 | * | 12/2021 | Manneschi | A61B 5/1176 |

FOREIGN PATENT DOCUMENTS

| | | | | | |
|---|---|---|---|---|---|
| CN | 106175782 A | * | 12/2016 | | A61B 5/1176 |
| CN | 106383370 A1 | * | 2/2017 | | A61B 5/1176 |
| CN | 110992546 A | * | 4/2020 | | |
| DE | 4400190 A1 | * | 7/1995 | | G01V 8/005 |
| JP | H1132322 A | * | 2/1999 | | |
| JP | 2007504562 A | * | 3/2007 | | |

(Continued)

*Primary Examiner* — Gail Kaplan Verbitsky
(74) *Attorney, Agent, or Firm* — Charles L. Thoeming

(57) ABSTRACT

An improved integrated access gateway and related systems and methods for controlled access to a defined environment including metal detection and at least one thermal imaging device is disclosed. A method for thermal detection of a fever in a human subject as part of the integrated access gateway is further disclosed. For embodiments of the integrated access gateway, information relating to refused access is provided to the individual and employer and/or appropriate governmental agency.

8 Claims, 2 Drawing Sheets

(56) References Cited

FOREIGN PATENT DOCUMENTS

| | | | | |
|---|---|---|---|---|
| JP | 2011067371 | A * | 4/2011 | |
| JP | 7243871 | B2 * | 3/2023 | ............... A61B 5/01 |
| KR | 20030061897 | A * | 7/2003 | |
| KR | 101177356 | B1 * | 8/2012 | |
| KR | 101978264 | B1 * | 8/2019 | |
| RU | 111939 | U1 * | 12/2011 | |
| RU | 2598291 | C1 * | 9/2016 | |
| WO | WO-03069320 | A2 * | 8/2003 | ............. G01T 1/163 |
| WO | WO-2022226214 | A1 * | 10/2022 | |
| WO | WO-2023277812 | A2 * | 1/2023 | |
| WO | WO-2023069793 | A1 * | 4/2023 | ............ B25J 9/1664 |

* cited by examiner

INTEGRATED ACCESS GATEWAY

CROSS-REFERENCES TO RELATED APPLICATIONS

This application claims the priority benefit of U.S. Provisional Application No. 62/704,511, filed May 14, 2020, the entirety of each of which is incorporated herein by reference.

STATEMENT REGARDING FEDERALLY SPONSORED RESEARCH OR DEVELOPMENT

None.

REFERENCE TO A MICRO-FICHE APPENDIX

None.

TECHNICAL FIELD

This invention relates to combined metal and thermal imaging devices, systems, and methods. More particularly, it relates to devices, systems, and methods for the automatic screening of threats on persons or fever with an integrated access gateway to a controlled space including metal detection and at least one thermal imaging device.

BACKGROUND OF THE INVENTION

Numerous controlled areas exist where access to the controlled area must provide safety within the controlled area. These controlled areas include work or shopping environments, mass transportation system assembly environments, and large sporting event venues, but are generally typified by any environment that provides high density human occupancy.

Various products provide singular function screening of access to the controlled areas on the level of metal detector gates or hand held thermal screening devices. The lack of a singular integrated access gateway to screen for threats on persons or fever makes these existing products bottlenecks to the desired flow of personal access to the controlled areas.

Security systems are limited in their ability to detect contraband, weapons, explosives, and other dangerous objects concealed under clothing. Metal detectors and chemical sniffers are commonly used for the detection of large metal objects and certain types of explosives; however, a wide range of dangerous objects exist that cannot be detected using these devices. Plastic and ceramic weapons increase the non-metallic objects that security personnel must detect. Manual searching of subjects is slow, is inconvenient, and would not be well tolerated by the general public, especially as a standard procedure in high traffic centers, such as at airports.

Most of dangerous infections, when progressing from the incubation to active phase, manifest in elevated body temperatures (fever). For example, SARS and the Covid-19 Pandemic are characterized by human fever over 38 degrees C. Body temperature is universally accepted as an important indicator of the physical condition of humans and other warm-blooded animals. It is therefore a logical assumption that detection of fever is a reliable means of identifying a sick human. Traditional thermometers will not register body temperature until after they are left in the body site for several minutes. Electronic thermometers that work faster. More advanced instrumentation has been developed for measuring human body temperatures—a noncontact infrared (IR) ear thermometer. While IR thermometers are non-contact in the scientific sense, practically they all come in physical contact with the human subjects. The only infrared thermometers that do not touch the subject are non-medical optical thermometers having relatively wide angle of view of several degrees or larger and thus inaccurate in fever detection.

Thus, there is a need for an integrated access gateway to a controlled area that screens for both threats on persons and fever on a twenty-four hours a day, seven days a week basis.

An object of the integrated access gateway to a controlled area that screens for both threats on persons and fever provides automated screening for these dangers as part of a dynamic, real time system for protecting the controlled area.

Another object of the integrated access gateway to a controlled area that screens for both threats on persons and fever provides individual identification as part of the dynamic, real time system for screening for these dangers and protecting the controlled area.

A further object of the integrated access gateway to a controlled area that screens for both threats on persons and fever provides the dynamic, real time system for screening for these dangers and protecting the controlled area without additional manhour costs.

An added object of the integrated access gateway to a controlled area that screens for both threats on persons and fever provides the dynamic, real time system for screening for these dangers and protecting the controlled area without impeding the flow of human access to the controlled area.

Yet another object of the integrated access gateway to a controlled area that screens for both threats on persons and fever provides the dynamic, real time system for screening for these dangers and protecting the controlled area is to inform individuals of potential health risks they have or pose to others.

A further object of the integrated access gateway to a controlled area that screens for both threats on persons and fever provides the dynamic, real time system for screening for these dangers and protecting the controlled area is to inform human resource offices in employment controlled access environments and governmental agencies for all controlled access environments of the reasons for denying a person controlled access.

DISCLOSURE OF INVENTION

An embodiment of the integrated access gateway to a controlled area provides a standard walkthrough metal detector including a noncontact fever detection system, a display panel screen on the front portion of the top of the metal detector frame, an alarm panel, two Internet Protocol (IP) cameras, a voice announcement board, a speaker and microphone connected to a Session Initiation Protocol (SIP) gateway for two-way telephone voice connection.

According to an embodiment of the integrated access gateway to a controlled area, a noncontact fever detection system includes positioning a single human candidate for controlled access in a operable zone for the metal detector and noncontact fever detection system.

According to an embodiment of the integrated access gateway to a controlled area, a noncontact fever detection system includes receiving identifying credential(s) from the human candidate for controlled access.

According to an embodiment of the integrated access gateway to a controlled area a human candidate for controlled access is scanned for concealed threats or fever.

According to an embodiment of the integrated access gateway to a controlled area the human candidate for controlled access is received into the controlled area if no alarms are received from the metal detector and noncontact fever detection systems.

According to an embodiment of the integrated access gateway to a controlled area the human candidate for controlled access is segregated from entering the controlled area upon alarm from either the metal detector or noncontact fever detection system Embodiments of the integrated access gateway to a controlled area provide a segregated human candidate for controlled access with information about the reason for being denied controlled access.

Embodiments of the integrated access gateway to a controlled area provide employer human relations or governmental agencies with information regarding denying the human candidate for controlled access.

BRIEF DESCRIPTION OF DRAWINGS

These and other features, aspects, and advantages of the integrated access gateway to a controlled area will become better understood regarding the following description, and drawings as further described.

BEST MODE FOR CARRYING OUT THE INVENTION

Figure 1:
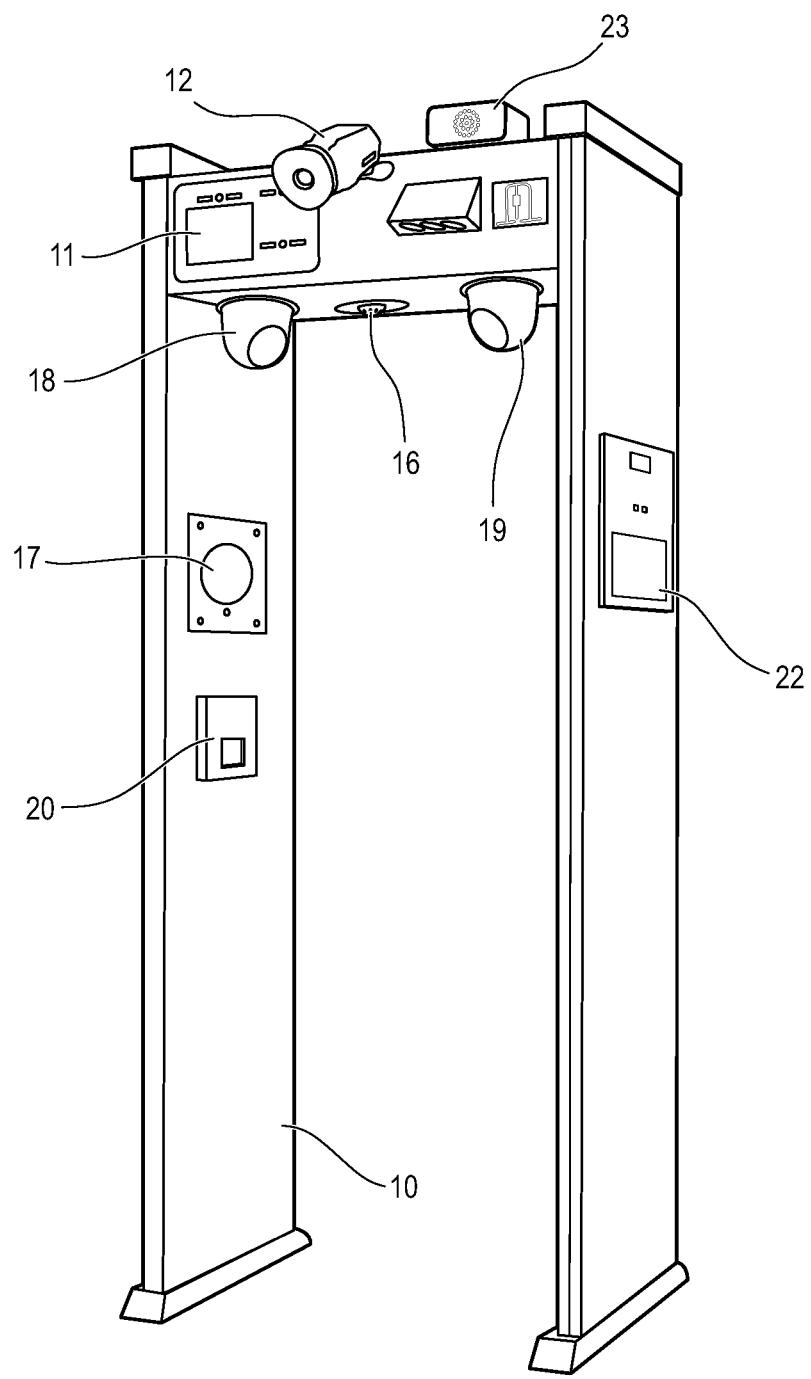
FIG. 1 is a perspective view of an embodiment of the integrated access gateway to a controlled area.
Figure 2:
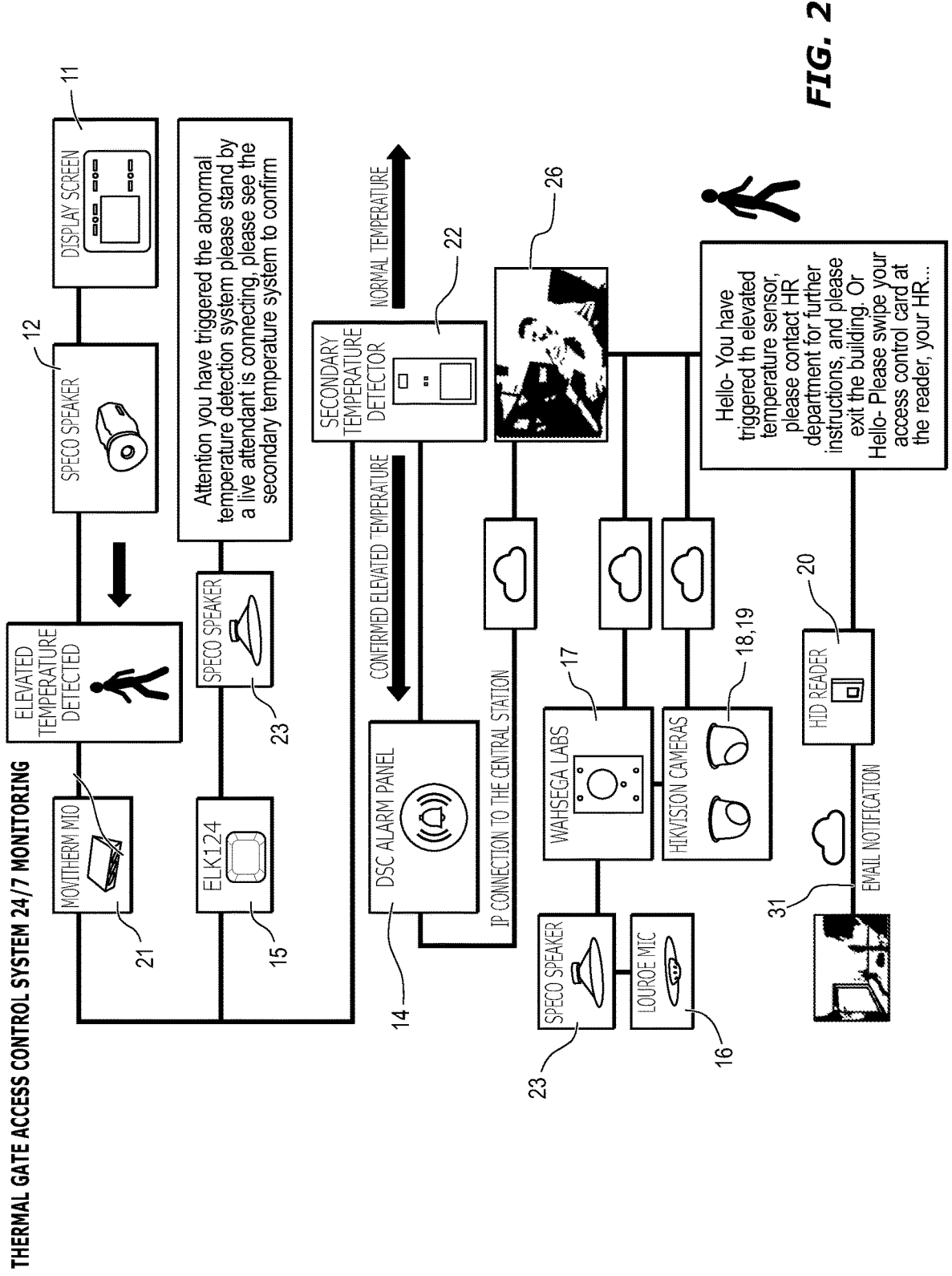
FIG. 2 is a schematic overview for a method of use of the noncontact fever detection system for an embodiment of the integrated access gateway to a controlled area

Embodiments of the disclosed integrated access gateway to a controlled area are depicted generally in FIGS. 1-2.

An embodiment of the integrated access gateway to a controlled area includes a standard walkthrough metal detector 10, a thermal camera 12 mounted on top of the metal detector 10, a secondary thermal reader 22, a display panel screen 11 on the front portion of the top of the metal detector 10 frame, an alarm panel 14, two IP cameras 18 and 19, a voice announcement board 15 and microphone 16 connected to a SIP gateway 17 for two-way telephone voice connection, an Human Interface Devices (HID) reader 20, an Input/Output Board, 21, and a speaker 23, FIGS. 1 and 2.

The thermal camera 12 and secondary thermal reader 22 for an embodiment of the integrated access gateway to a controlled area is part of method for the thermal imaging system, FIG. 2 which provides at least one thermal imaging camera 12 mounted on the top of the metal detector 10 frame, signal processing equipment, a fever threshold generator, at least one signal comparator, and at least one indicator.

An embodiment of the integrated access gateway includes a target gate positioned in view of the at least one thermal imaging camera.

An embodiment of the integrated access gateway includes at least one source of a reference thermal radiation signal having a preset level of thermal radiation.

An embodiment of the Integrated access gateway provides a fever threshold generator that generates a threshold in relation to ambient temperature.

An embodiment of the integrated access gateway includes a position detector for detecting presence of a human subject within a field of view of the thermal imaging camera.

A method of an embodiment of the integrated access gateway system for noncontact detection of a fever in a human subject includes the steps:

a) exposing the face of a human subject to a thermal imaging camera;
b) taking a thermal image of the face of the human subject by a thermal imaging camera; and
c) processing a thermal image to determine the maximum level of thermal radiation from the face of the human subject.

A method of an embodiment of the integrated access gateway system for noncontact detection of a fever in a human subject further includes the step of comparing the maximum level of a thermal radiation with a pre-selected threshold value.

A method of an embodiment of the integrated access gateway system for noncontact detection of a fever in a human subject further includes the step of indicating fever if the level of a thermal radiation exceeds the threshold value.

A method of an embodiment of the integrated access gateway system for noncontact detection of a fever in a human subject further includes the step of positioning a human subject within the opening of a target gate.

A method of an embodiment of the integrated access gateway system for noncontact detection of a fever in a human subject further includes the step of generating an infrared signal by a reference target positioned within the field of view of the thermal imaging camera.

A method of an embodiment of the integrated access gateway system for noncontact detection of a fever in a human subject further includes the step of computing a skin temperature of a human subject as function of the maximum level of thermal radiation.

A method of an embodiment of the integrated access gateway system for noncontact detection of a fever in a human subject further includes the step of computing a core temperature of a human subject including an adjusting of the maximum level of thermal radiation by the value of a reference temperature.

A method of an embodiment of the integrated access gateway system for noncontact detection of a fever in a human subject where a reference temperature is an ambient temperature.

A method of an embodiment of the integrated access gateway system for noncontact detection of a fever in a human subject provides a reference temperature as a temperature computed from a thermal radiation detected by an imaging camera from clothing of the human subject.

A method of an embodiment of the integrated access gateway system for noncontact detection of a fever in a human subject further includes the step of exposing the infrared camera to a reference target and adjusting the pre-selected threshold by the infrared signal from a reference target.

A method of an embodiment of the integrated access gateway system for noncontact detection of a fever in a human subject further includes the step of taking a picture of a human subject by a video camera operating substantially in a visible spectral range and adjusting the position of the thermal imaging camera to position its field of view over the human subject.

A method of an embodiment of the integrated access gateway system includes steps:

a) providing at least one walkthrough metal detector 10, a thermal camera 12 mounted on top of the metal detector 10 frame, a secondary thermal reader 22, a display panel screen 11 on the front portion of the top of the metal detector 10 frame, an alarm panel 14, two IP cameras 18 and 19, a voice announcement board 15 and microphone 16 connected to a SIP gateway 17 for two-way telephone voice connection, an HID reader 20, an Input/Output Board, 21, and a speaker 23, FIGS. 1 and 2;

b) positioning a single human candidate for controlled access in an operable zone for the metal detector and noncontact fever detection system which includes a thermal camera 12 and a secondary thermal reader 22;

c) receiving identifying credential(s) from the human candidate for controlled access;

d) scanning the human candidate for controlled access for concealed threats or fever;

e) receiving the human candidate for controlled access into the controlled area if no alarms are received from the metal detector and noncontact fever detection systems or segregating the human candidate for controlled access upon alarm from either the metal detector and noncontact fever detection system with instruction from a supervisory attendant 26;

f) providing a segregated human candidate for controlled access with information about the reason for being denied controlled access 31; and g) providing human relations or governmental agencies with information regarding denying the human candidate for controlled access.

Apparatus, systems and methods for improved integrated access gateway control are disclosed. Variations of the disclosed apparatus, systems and methods for improved integrated access gateway control would be useful to those with ordinary skill in the art.

I claim:

1. An integrated access gateway comprising, in combination:
   (a) a walkthrough metal detector comprising a frame;
   (b) at least one thermal camera mounted on a top portion of the metal detector frame;
   (c) a secondary thermal reader attached to the metal detector frame;
   (d) a display panel screen on a front top portion of the metal detector frame;
   (e) an alarm panel attached to the metal detector frame;
   (f) two Internet Protocol cameras attached to the metal detector frame;
   (g) a voice announcement board attached to the metal detector frame;
   (h) a microphone connected to a Session Initiation Protocol gateway attached to the frame for two-way telephone voice connection;
   (i) a Human Interface Device reader attached to the metal detector frame;
   (j) an Input/Output Board connected to the metal detector frame; and
   (k) a speaker connected to the metal detector frame.

2. The integrated access gateway of claim 1, wherein the thermal camera and secondary temperature detector comprise:
   (a) signal processing equipment;
   (b) a fever threshold generator;
   (c) at least one signal comparator; and
   (d) at least one signal indicator.

3. The integrated access gateway of claim 1, further comprising a target gate positioned in view of the at least one thermal imaging camera.

4. The integrated access gateway of claim 1, further comprising at least one source of a reference thermal radiation signal having a preset level of thermal radiation.

5. The integrated access gateway of claim 2, further comprising a fever threshold generator that generates a threshold in relation to ambient temperature.

6. The integrated access gateway of claim 2, further comprising at least one source of a reference thermal radiation signal having a preset level of thermal radiation.

7. The integrated access gateway of claim 1, further comprising a position detector attached to the metal detector frame for detecting presence of a human subject within a field of view of the thermal imaging camera.

8. A method for an integrated access gateway system comprising the steps:
   (a) providing a walk through metal detector comprising a frame, at least one thermal camera mounted on a top portion of the metal detector frame, a secondary thermal reader attached to the metal detector frame, a display panel screen on a front top portion of the metal detector frame, an alarm panel attached to the metal detector frame, two Internet Protocol cameras attached to the metal detector frame, a voice announcement board attached to the metal detector frame, a microphone connected to a Session Initiation Protocol gateway attached to the frame for two-way telephone voice connection, a Human Interface Device reader attached to the metal detector frame, an Input/Output Board connected to the metal detector frame, and a speaker connected to the metal detector frame;
   (b) positioning a single human candidate for controlled access in an operable zone for the metal detector and non-contact fever detection system which includes a thermal camera and a secondary thermal reader;
   (c) receiving identifying credential(s) from the human candidate for controlled access;
   (d) scanning the human candidate for controlled access for concealed threats or fever;
   (e) receiving the human candidate for controlled access into the controlled area if no alarms are received from the metal detector and non-contact fever detection systems or segregating the human candidate for controlled access upon alarm from either the metal detector and non-contact fever detection system with instruction from a supervisory attendant;
   (f) providing a segregated human candidate for controlled access with information about the reason for being denied controlled access; and
   (g) providing human relations or governmental agencies with information regarding denying the human candidate for controlled access.

\* \* \* \* \*